United States Patent
Singh

(10) Patent No.: US 11,782,733 B2
(45) Date of Patent: Oct. 10, 2023

(54) TRAINING AN ARTIFICIAL INTELLIGENCE / MACHINE LEARNING MODEL TO RECOGNIZE APPLICATIONS, SCREENS, AND USER INTERFACE ELEMENTS USING COMPUTER VISION

(71) Applicant: UiPath, Inc., New York, NY (US)

(72) Inventor: Prabhdeep Singh, Bellevue, WA (US)

(73) Assignee: UiPath, Inc., New York, NY (US)

( * ) Notice: Subject to any disclaimer, the term of this patent is extended or adjusted under 35 U.S.C. 154(b) by 385 days.

(21) Appl. No.: 17/070,108

(22) Filed: Oct. 14, 2020

(65) Prior Publication Data
US 2022/0113991 A1    Apr. 14, 2022

(51) Int. Cl.

| | |
|---|---|
| *G06F 9/451* | (2018.01) |
| *G06N 20/00* | (2019.01) |
| *G06K 9/00* | (2022.01) |
| *G06K 9/62* | (2022.01) |
| *G06V 20/40* | (2022.01) |
| *G06F 18/40* | (2023.01) |
| *G06F 18/214* | (2023.01) |
| *G06V 30/10* | (2022.01) |

(52) U.S. Cl.
CPC ............ *G06F 9/451* (2018.02); *G06F 18/214* (2023.01); *G06F 18/40* (2023.01); *G06N 20/00* (2019.01); *G06V 20/40* (2022.01); *G06V 30/10* (2022.01)

(58) Field of Classification Search
CPC ........ G06F 9/451; G06F 18/40; G06F 18/214; G06N 20/20; G06N 20/00; G06V 20/40; G06V 30/10; G06K 9/6253; G06K 9/6256
See application file for complete search history.

(56) References Cited

U.S. PATENT DOCUMENTS 7,682,026 B2    3/2010  Huffman et al.
9,448,908 B2 *  9/2016  Carmi ................. G06F 11/3447
(Continued)

FOREIGN PATENT DOCUMENTS

CN          111124888 A       5/2020

OTHER PUBLICATIONS

International Search Report & Written Opinion, dated Feb. 4, 2022, PCT Application No. PCT/US21/53484.

*Primary Examiner* — Cesar B Paula
*Assistant Examiner* — Carl E Barnes, Jr.
(74) *Attorney, Agent, or Firm* — LeonardPatel PC; Michael A. Leonard, II; Sheetal S. Patel

(57) ABSTRACT

Techniques for training an artificial intelligence (AI)/machine learning (ML) model to recognize applications, screens, and UI elements using computer vision (CV) and to recognize user interactions with the applications, screens, and UI elements. Optical character recognition (OCR) may also be used to assist in training the AI/ML model. Training of the AI/ML model may be performed without other system inputs such as system-level information (e.g., key presses, mouse clicks, locations, operating system operations, etc.) or application-level information (e.g., information from an application programming interface (API) from a software application executing on a computing system), or the training of the AI/ML model may be supplemented by other information, such as browser history, heat maps, file information, currently running applications and locations, system level and/or application-level information, etc.

23 Claims, 8 Drawing Sheets

(56) References Cited

U.S. PATENT DOCUMENTS

| | | | |
|---|---|---|---|
| 10,409,712 B2 | 9/2019 | Dwarakanath et al. | |
| 10,474,440 B2 * | 11/2019 | Kochura | G06F 9/451 |
| 11,099,972 B2 * | 8/2021 | Puszkiewicz | G06F 11/3664 |
| 11,513,670 B2 * | 11/2022 | Singh | G06F 17/18 |
| 2007/0300179 A1 * | 12/2007 | Friedlander | G06Q 10/06 715/781 |
| 2016/0349928 A1 * | 12/2016 | Li | G06F 16/24578 |
| 2018/0046248 A1 | 2/2018 | Lopez et al. | |
| 2019/0034765 A1 | 1/2019 | Kaehler et al. | |
| 2019/0087691 A1 * | 3/2019 | Jelveh | G06K 9/6263 |
| 2019/0163499 A1 | 5/2019 | Kebets et al. | |
| 2019/0251707 A1 * | 8/2019 | Gupta | G06T 9/002 |
| 2019/0324781 A1 * | 10/2019 | Ramamurthy | G06N 3/0454 |
| 2019/0384699 A1 | 12/2019 | Arbon et al. | |
| 2020/0012481 A1 | 1/2020 | Kochura | |
| 2020/0019418 A1 * | 1/2020 | P K | G06K 9/6267 |
| 2020/0249964 A1 * | 8/2020 | Fernandes | G06F 9/451 |

\* cited by examiner

TRAINING AN ARTIFICIAL INTELLIGENCE / MACHINE LEARNING MODEL TO RECOGNIZE APPLICATIONS, SCREENS, AND USER INTERFACE ELEMENTS USING COMPUTER VISION

FIELD

The present invention generally relates to user interface (UI) automation, and more specifically, to training an artificial intelligence (AI)/machine learning (ML) model to recognize applications, screens, and UI elements using computer vision (CV) and to recognize user interactions with the applications, screens, and UI elements.

BACKGROUND

In order to perform UI automation, RPA technologies may utilize driver and/or application-level interactions to click buttons, enter text, and perform other interactions with a UI. However, key presses, mouse clicks, and other kernel hook information may not be available at the system level in some embodiments, or when building a new UI automation platform. Extensive driver level and application level functionality is typically required to implement such a UI automation platform. Accordingly, alternative techniques for providing UI automation may be beneficial.

SUMMARY

Certain embodiments of the present invention may provide solutions to the problems and needs in the art that have not yet been fully identified, appreciated, or solved by current UI automation technologies. For example, some embodiments of the present invention pertain to training an AI/ML model to recognize applications, screens, and UI elements using CV and to recognize user interactions with the applications, screens, and UI elements.

In an embodiment, a system includes one or more user computing systems including respective recorder processes and a server configured to train an AI/ML model to recognize applications, screens, and UI elements using CV and to recognize user interactions with the applications, screens, and UI elements. The respective recorder processes are configured to record screenshots or video frames of a display associated with the respective user computing system and other information. The respective recorder processes are also configured to send the recorded screenshots or video frames, and the other information, to storage accessible by the server. The server is configured to initially train the AI/ML model to recognize the applications, screens, and UI elements that are present in the recorded screenshots or video frames using the recorded screenshots or video frames and the other information. After the AI/ML model can recognize the applications, screens, and UI elements in the recorded screenshots or video frames with a confidence, the server is also configured to train the AI/ML model to recognize individual user interactions with the UI elements.

In another embodiment, a non-transitory computer-readable medium stores a computer program configured to train an AI/ML model to recognize applications, screens, and UI elements using CV and/or to recognize user interactions with the applications, screens, and UI elements. The computer program is configured to cause at least one processor to access recorded screenshots or video frames of displays associated with one or more computing systems and access other information associated with the one or more computing systems. The computer program is also configured to cause at least one processor to initially train the AI/ML model to recognize the applications, screens, and UI elements that are present in the recorded screenshots or video frames using the recorded screenshots or video frames and the other information. The initial training of the AI/ML model is performed without a priori knowledge of the applications, screens, and UI elements in the screenshots or video frames.

In yet another embodiment, a computer-implemented method for training an AI/ML model to recognize applications, screens, and UI elements using CV and to recognize user interactions with the applications, screens, and UI elements includes accessing recorded screenshots or video frames of displays associated with one or more computing systems and accessing other information associated with the one or more computing systems. The computer-implemented method also includes initially training the AI/ML model to recognize the applications, screens, and UI elements that are present in the recorded screenshots or video frames using the recorded screenshots or video frames and the other information. After the AI/ML model can recognize the applications, screens, and UI elements in the recorded screenshots or video frames with a confidence, the computer-implemented method further includes training the AI/ML model to recognize individual user interactions with the UI elements.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

Unless otherwise indicated, similar reference characters denote corresponding features consistently throughout the attached drawings.

DETAILED DESCRIPTION OF THE EMBODIMENTS

Figure 1:
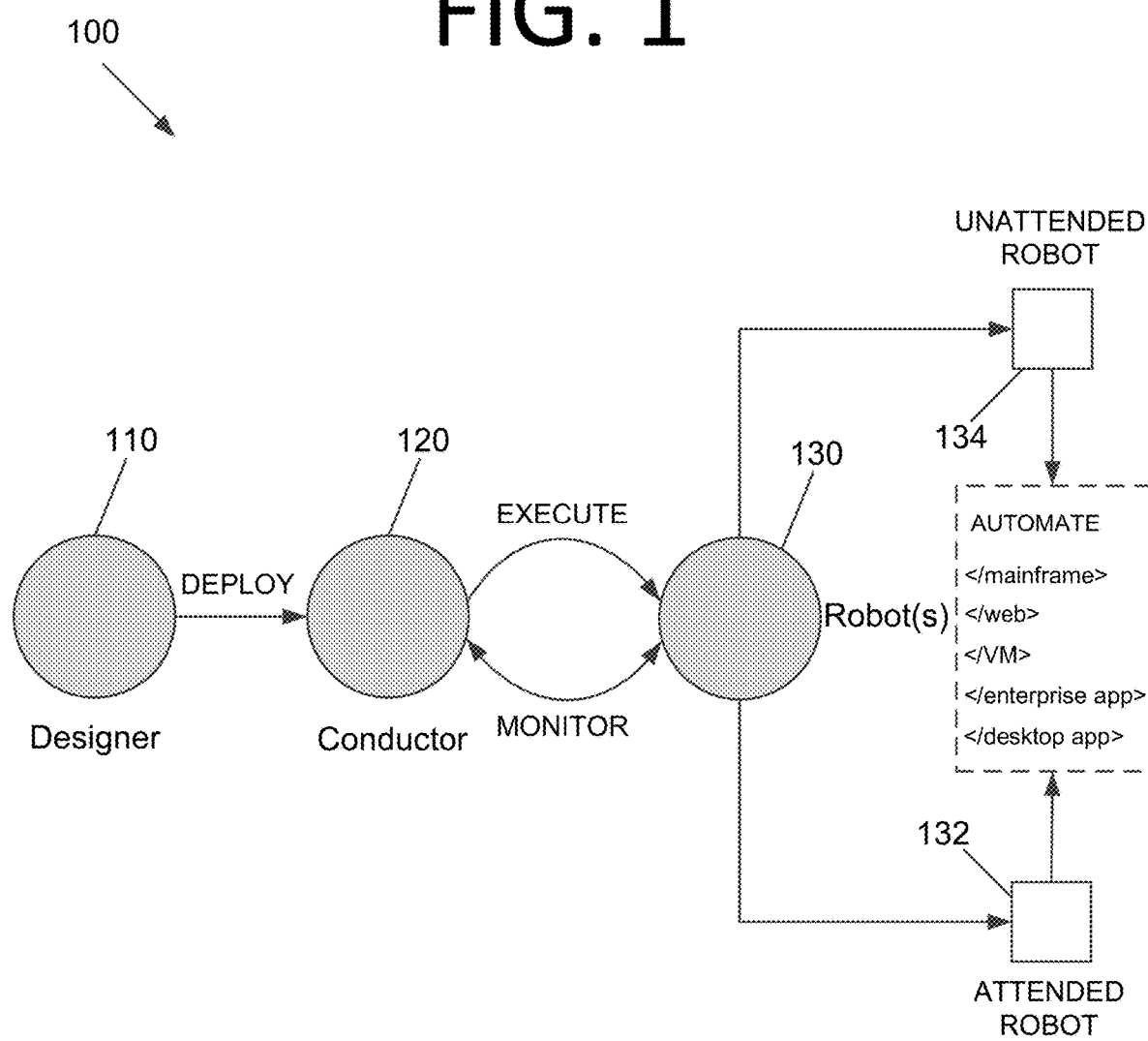
FIG. 1 is an architectural diagram illustrating a robotic process automation (RPA) system, according to an embodiment of the present invention.

Some embodiments pertain to training an AI/ML model to recognize applications, screens, and UI elements using CV and to recognize user interactions with the applications, screens, and UI elements. In certain embodiments, optical character recognition (OCR) may also be used to assist in training the AI/ML model. In some embodiments, training of the AI/ML model may be performed without other system inputs such as system-level information (e.g., key presses, mouse clicks, locations, operating system operations, etc.) or application-level information (e.g., information from an application programming interface (API) from a software application executing on a computing system), such as that provided by the driver of UiPath Studio™ However, in certain embodiments, the training of the AI/ML model may be supplemented by other information, such as browser history, file information, currently running applications and locations, system level and/or application-level information, etc.

Some embodiments begin training the AI/ML model by feeding the initial version of the AI/ML model labeled screen images from one or more computing systems as a training input. The AI/ML model provides predictions as output, such as which application(s) and graphical element(s) are recognized as being present in a screen. Identification errors can be highlighted by a human reviewer (e.g., by drawing a box around the misidentified element and including the correct identification), and the AI/ML model can be trained until its accuracy is sufficiently high to be deployed to observe applications and graphical elements that are present in screens of a UI.

Rather than training from images alone, in some embodiments, tracking code may also be embedded in the user's computing system. For instance, a snippet of JavaScript® may be embedded in a web browser as a listener to track what components the user interacts with, what text the user enters, what locations/components the user clicks with the mouse, what content the user scrolled past, how long the user stopped on a certain part of the content, etc. Scrolling past content may indicate that the content may have been somewhat close but did not have exactly what the user wanted. Clicks may indicate success.

Listener applications need not be JavaScript®, and may be any suitable type of application and in any desired programming language without deviating from the scope of the invention. This may allow "generalizing" of the listener application such that it can track user interactions with multiple applications or any application that the user is interacting with. Using labeled training data from scratch may be difficult since while it may allow the AI/ML model to learn to recognize various controls, it does not contain information regarding which controls are commonly used and how. Using listener applications, a "heat map" could be generated to help bootstrap the AI/ML model training process. The heat map may include various information, such as the frequency that a user used applications, the frequency that the user interacted with components of the applications, the locations of the components, the content of the applications/components, etc. In some embodiments, the heat map may be derived from screen analysis, such as detection of typed and/or pasted text, caret tracking, and active element detection for a computing system. Some embodiments recognize where on the screen associated with a computing system the user has been typing or pasting text, potentially including hot keys or other keys that do not cause visible characters to appear, and provide the physical position on the screen based on the current resolution (e.g., in coordinates) of where one or more characters appeared, where the cursor was blinking, or both. The physical position of the typing or pasting activity and/or of the caret may allow determination of which field(s) the user is typing in or focused on and what the application is for process discovery or other applications.

Some embodiments are implemented in a feedback loop process that continuously or periodically compares the current screenshot to the previous screenshot to identify changes. Locations where visual changes occurred on the screen may be identified and optical character recognition (OCR) may be performed on the location where the change occurred. Results of the OCR may then be compared to the content of a keyboard queue (e.g., as determined by key hooking) to determine whether a match exists. The locations where the change occurred may be determined by comparing a box of pixels from the current screenshot to a box of pixels in the same location from a previous screenshot. When a match is found, the text of the location where the change occurred may be associated with that location and provided as part of the listener information.

Once the heat map has been generated, the AI/ML model could be trained on screen images (potentially millions of images) based on the initial heat map information. Graphics processing units (GPUs) may be able to process this information and train the AI/ML model relatively quickly. Once graphical elements, windows, applications, etc. can be accurately identified, the AI/ML model may be trained to recognize labeled user interactions with the applications in the UI to understand incremental actions taken by the user. One or a series of graphical element changes may be indicative of a user clicking a button, entering text, interacting with a menu, closing a window, moving to a different screen of an application, etc. For instance, a menu item that the user clicks may become underlined, a button may be shaded darker while it is pressed and then return to the original shade when the user releases the mouse button, the letter "a" may appear in a text field, an image may change to a different image, a screen may assume a different layout when the user moves to the next screen of an application of a series of screens, etc.

Identification errors can again be highlighted by a human reviewer (e.g., by drawing a box around the misidentified element and including the correct identification). The AI/ML model can then be trained until its accuracy is sufficiently high to be deployed to understand granular user interactions with the UI. Such a trained AI/ML model may then be used to observe multiple users and look for common sequences of interactions in common applications, for example.

In some embodiments, training of the AI/ML model may be supplemented with information from "automation boxes", which are implemented via hardware or software and observe what information is coming from an input device, such as a mouse or the keyboard. In certain embodiments, a camera may be used to track where the user is looking on the screen. The information from automation boxes and/or cameras may be time stamped and used in conjunction with the graphical elements, applications, and screens detected by the AI/ML model to assist in its training and better understand what the user is doing at the time.

Certain embodiments may be employed for robotic process automation (RPA). FIG. 1 is an architectural diagram illustrating an RPA system 100, according to an embodiment of the present invention. RPA system 100 includes a designer 110 that allows a developer to design and implement workflows. Designer 110 may provide a solution for application integration, as well as automating third-party applications, administrative Information Technology (IT) tasks, and business IT processes. Designer 110 may facilitate development of an automation project, which is a graphical representation of a business process. Simply put, designer 110 facilitates the development and deployment of workflows and robots.

The automation project enables automation of rule-based processes by giving the developer control of the execution order and the relationship between a custom set of steps developed in a workflow, defined herein as "activities." One commercial example of an embodiment of designer 110 is UiPath Studio™. Each activity may include an action, such as clicking a button, reading a file, writing to a log panel, etc. In some embodiments, workflows may be nested or embedded.

Some types of workflows may include, but are not limited to, sequences, flowcharts, FSMs, and/or global exception handlers. Sequences may be particularly suitable for linear processes, enabling flow from one activity to another without cluttering a workflow. Flowcharts may be particularly suitable to more complex business logic, enabling integration of decisions and connection of activities in a more diverse manner through multiple branching logic operators. FSMs may be particularly suitable for large workflows. FSMs may use a finite number of states in their execution, which are triggered by a condition (i.e., transition) or an activity. Global exception handlers may be particularly suitable for determining workflow behavior when encountering an execution error and for debugging processes.

Once a workflow is developed in designer 110, execution of business processes is orchestrated by conductor 120, which orchestrates one or more robots 130 that execute the workflows developed in designer 110. One commercial example of an embodiment of conductor 120 is UiPath Orchestrator™. Conductor 120 facilitates management of the creation, monitoring, and deployment of resources in an environment. Conductor 120 may act as an integration point, or one of the aggregation points, with third-party solutions and applications.

Conductor 120 may manage a fleet of robots 130, connecting and executing robots 130 from a centralized point. Types of robots 130 that may be managed include, but are not limited to, attended robots 132, unattended robots 134, development robots (similar to unattended robots 134, but used for development and testing purposes), and nonproduction robots (similar to attended robots 132, but used for development and testing purposes). Attended robots 132 are triggered by user events and operate alongside a human on the same computing system. Attended robots 132 may be used with conductor 120 for a centralized process deployment and logging medium. Attended robots 132 may help the human user accomplish various tasks, and may be triggered by user events. In some embodiments, processes cannot be started from conductor 120 on this type of robot and/or they cannot run under a locked screen. In certain embodiments, attended robots 132 can only be started from a robot tray or from a command prompt. Attended robots 132 should run under human supervision in some embodiments.

Unattended robots 134 run unattended in virtual environments and can automate many processes. Unattended robots 134 may be responsible for remote execution, monitoring, scheduling, and providing support for work queues. Debugging for all robot types may be run in designer 110 in some embodiments. Both attended and unattended robots may automate various systems and applications including, but not limited to, mainframes, web applications, VMs, enterprise applications (e.g., those produced by SAP®, SalesForce®, Oracle®, etc.), and computing system applications (e.g., desktop and laptop applications, mobile device applications, wearable computer applications, etc.).

Conductor 120 may have various capabilities including, but not limited to, provisioning, deployment, versioning, configuration, queueing, monitoring, logging, and/or providing interconnectivity. Provisioning may include creating and maintenance of connections between robots 130 and conductor 120 (e.g., a web application). Deployment may include assuring the correct delivery of package versions to assigned robots 130 for execution. Versioning may include management of unique instances of some process or configuration in some embodiments. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., an SQL database) and/or another storage mechanism (e.g., ElasticSearch®, which provides the ability to store and quickly query large datasets). Conductor 120 may provide interconnectivity by acting as the centralized point of communication for third-party solutions and/or applications.

Robots 130 are execution agents that run workflows built in designer 110. One commercial example of some embodiments of robot(s) 130 is UiPath Robots™ In some embodiments, robots 130 install the Microsoft Windows® Service Control Manager (SCM)-managed service by default. As a result, such robots 130 can open interactive Windows® sessions under the local system account, and have the rights of a Windows® service.

In some embodiments, robots 130 can be installed in a user mode. For such robots 130, this means they have the same rights as the user under which a given robot 130 has been installed. This feature may also be available for High Density (HD) robots, which ensure full utilization of each machine at its maximum potential. In some embodiments, any type of robot 130 may be configured in an HD environment.

Robots 130 in some embodiments are split into several components, each being dedicated to a particular automation task. The robot components in some embodiments include, but are not limited to, SCM-managed robot services, user mode robot services, executors, agents, and command line. SCM-managed robot services manage and monitor Windows® sessions and act as a proxy between conductor 120 and the execution hosts (i.e., the computing systems on which robots 130 are executed). These services are trusted with and manage the credentials for robots 130. A console application is launched by the SCM under the local system.

User mode robot services in some embodiments manage and monitor Windows® sessions and act as a proxy between conductor 120 and the execution hosts. User mode robot services may be trusted with and manage the credentials for robots 130. A Windows® application may automatically be launched if the SCM-managed robot service is not installed.

Executors may run given jobs under a Windows® session (i.e., they may execute workflows. Executors may be aware of per-monitor dots per inch (DPI) settings. Agents may be Windows® Presentation Foundation (WPF) applications that display the available jobs in the system tray window. Agents may be a client of the service. Agents may request to start or stop jobs and change settings. The command line is a client of the service. The command line is a console application that can request to start jobs and waits for their output.

Having components of robots 130 split as explained above helps developers, support users, and computing systems more easily run, identify, and track what each component is executing. Special behaviors may be configured per component this way, such as setting up different firewall rules for the executor and the service. The executor may always be aware of DPI settings per monitor in some embodiments. As a result, workflows may be executed at any DPI, regardless of the configuration of the computing system on which they were created. Projects from designer 110 may also be independent of browser zoom level in some embodiments. For applications that are DPI-unaware or intentionally marked as unaware, DPI may be disabled in some embodiments.

Figure 2:
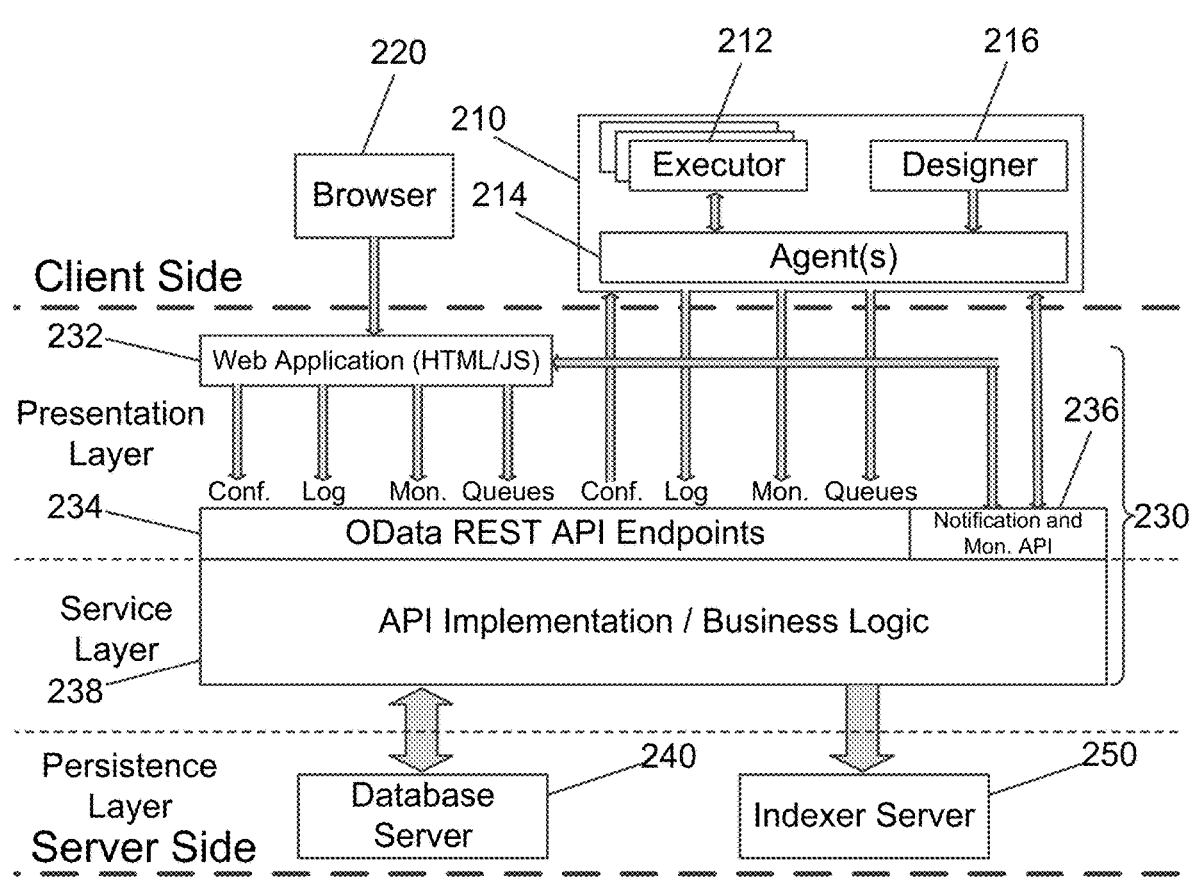
FIG. 2 is an architectural diagram illustrating a deployed RPA system, according to an embodiment of the present invention.

FIG. 2 is an architectural diagram illustrating a deployed RPA system 200, according to an embodiment of the present invention. In some embodiments, RPA system 200 may be, or may be a part of, RPA system 100 of FIG. 1. It should be noted that the client side, the server side, or both, may include any desired number of computing systems without deviating from the scope of the invention. On the client side, a robot application 210 includes executors 212, an agent 214, and a designer 216. However, in some embodiments, designer 216 may not be running on computing system 210. Executors 212 are running processes. Several business projects may run simultaneously, as shown in FIG. 2. Agent 214 (e.g., a Windows® service) is the single point of contact for all executors 212 in this embodiment. All messages in this embodiment are logged into conductor 230, which processes them further via database server 240, indexer server 250, or both. As discussed above with respect to FIG. 1, executors 212 may be robot components.

In some embodiments, a robot represents an association between a machine name and a username. The robot may manage multiple executors at the same time. On computing systems that support multiple interactive sessions running simultaneously (e.g., Windows® Server 2012), multiple robots may be running at the same time, each in a separate Windows® session using a unique username. This is referred to as HD robots above.

Agent 214 is also responsible for sending the status of the robot (e.g., periodically sending a "heartbeat" message indicating that the robot is still functioning) and downloading the required version of the package to be executed. The communication between agent 214 and conductor 230 is always initiated by agent 214 in some embodiments. In the notification scenario, agent 214 may open a WebSocket channel that is later used by conductor 230 to send commands to the robot (e.g., start, stop, etc.).

On the server side, a presentation layer (web application 232, Open Data Protocol (OData) Representative State Transfer (REST) Application Programming Interface (API) endpoints 234, and notification and monitoring 236), a service layer (API implementation/business logic 238), and a persistence layer (database server 240 and indexer server 250) are included. Conductor 230 includes web application 232, OData REST API endpoints 234, notification and monitoring 236, and API implementation/business logic 238. In some embodiments, most actions that a user performs in the interface of conductor 230 (e.g., via browser 220) are performed by calling various APIs. Such actions may include, but are not limited to, starting jobs on robots, adding/removing data in queues, scheduling jobs to run unattended, etc. without deviating from the scope of the invention. Web application 232 is the visual layer of the server platform. In this embodiment, web application 232 uses Hypertext Markup Language (HTML) and JavaScript (JS). However, any desired markup languages, script languages, or any other formats may be used without deviating from the scope of the invention. The user interacts with web pages from web application 232 via browser 220 in this embodiment in order to perform various actions to control conductor 230. For instance, the user may create robot groups, assign packages to the robots, analyze logs per robot and/or per process, start and stop robots, etc.

In addition to web application 232, conductor 230 also includes service layer that exposes OData REST API endpoints 234. However, other endpoints may be included without deviating from the scope of the invention. The REST API is consumed by both web application 232 and agent 214. Agent 214 is the supervisor of one or more robots on the client computer in this embodiment.

The REST API in this embodiment covers configuration, logging, monitoring, and queueing functionality. The configuration endpoints may be used to define and configure application users, permissions, robots, assets, releases, and environments in some embodiments. Logging REST endpoints may be used to log different information, such as errors, explicit messages sent by the robots, and other environment-specific information, for instance. Deployment REST endpoints may be used by the robots to query the package version that should be executed if the start job command is used in conductor 230. Queueing REST endpoints may be responsible for queues and queue item management, such as adding data to a queue, obtaining a transaction from the queue, setting the status of a transaction, etc.

Monitoring REST endpoints may monitor web application 232 and agent 214. Notification and monitoring API 236 may be REST endpoints that are used for registering agent 214, delivering configuration settings to agent 214, and for sending/receiving notifications from the server and agent 214. Notification and monitoring API 236 may also use WebSocket communication in some embodiments.

The persistence layer includes a pair of servers in this embodiment—database server 240 (e.g., a SQL server) and indexer server 250. Database server 240 in this embodiment stores the configurations of the robots, robot groups, associated processes, users, roles, schedules, etc. This information is managed through web application 232 in some embodiments. Database server 240 may manages queues and queue items. In some embodiments, database server 240 may store messages logged by the robots (in addition to or in lieu of indexer server 250).

Indexer server 250, which is optional in some embodiments, stores and indexes the information logged by the robots. In certain embodiments, indexer server 250 may be disabled through configuration settings. In some embodiments, indexer server 250 uses ElasticSearch®, which is an open source project full-text search engine. Messages logged by robots (e.g., using activities like log message or write line) may be sent through the logging REST endpoint(s) to indexer server 250, where they are indexed for future utilization.

Figure 3:
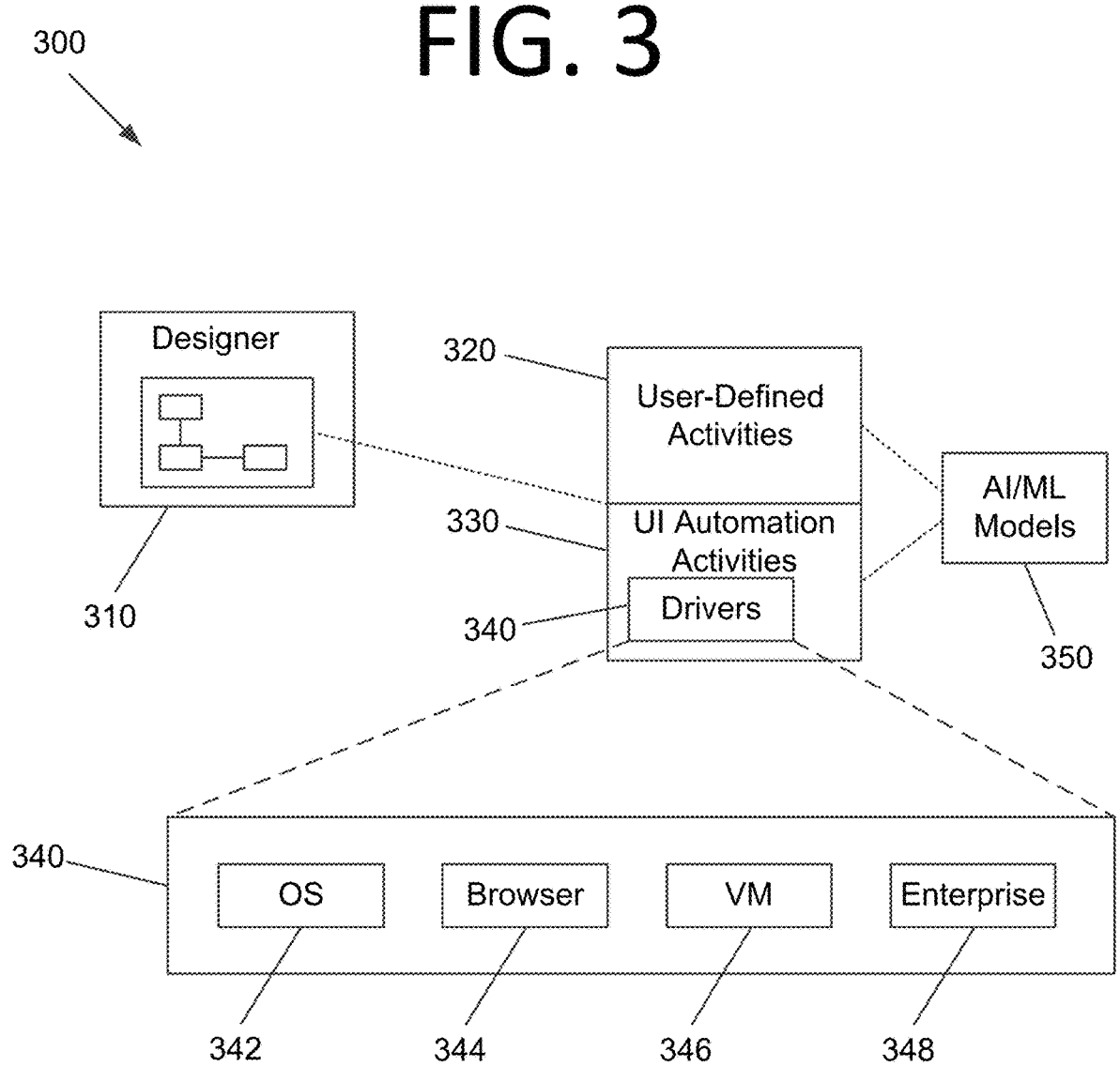
FIG. 3 is an architectural diagram illustrating the relationship between a designer, activities, and drivers, according to an embodiment of the present invention.

FIG. 3 is an architectural diagram illustrating the relationship 300 between a designer 310, activities 320, 330, drivers 340, and AI/ML models 350, according to an embodiment of the present invention. Per the above, a developer uses designer 310 to develop workflows that are executed by robots. Workflows may include user-defined activities 320 and UI automation activities 330. User-defined activities 320 and/or UI automation activities 330 may call one or more AI/ML models 350 in some embodiments, which may be located locally to the computing system on which the robot is operating and/or remotely thereto. Some embodiments are able to identify non-textual visual components in an image, which is called computer vision (CV) herein. Some CV activities pertaining to such components may include, but are not limited to, click, type, get text, hover, element exists, refresh scope, highlight, etc. Click in some embodiments identifies an element using CV, optical character recognition (OCR), fuzzy text matching, and multi-anchor, for example, and clicks it. Type may identify an element using the above and types in the element. Get text may identify the location of specific text and scan it using OCR. Hover may identify an element and hover over it. Element exists may check whether an element exists on the screen using the techniques described above. In some embodiments, there may be hundreds or even thousands of activities that can be implemented in designer 310. However, any number and/or type of activities may be available without deviating from the scope of the invention.

UI automation activities 330 are a subset of special, lower level activities that are written in lower level code (e.g., CV activities) and facilitate interactions with the screen. UI automation activities 330 facilitate these interactions via drivers 340 and/or AI/ML models 350 that allow the robot to interact with the desired software. For instance, drivers 340 may include OS drivers 342, browser drivers 344, VM drivers 346, enterprise application drivers 348, etc. One or more of AI/ML models 350 may be used by UI automation activities 330 in order to determine perform interactions with the computing system. In some embodiments, AI/ML models 350 may augment drivers 340 or replace them completely. Indeed, in certain embodiments, drivers 340 are not included.

Drivers 340 may interact with the OS at a low level looking for hooks, monitoring for keys, etc. They may facilitate integration with Chrome®, IE®, Citrix®, SAP®, etc. For instance, the "click" activity performs the same role in these different applications via drivers 340.

Figure 4:
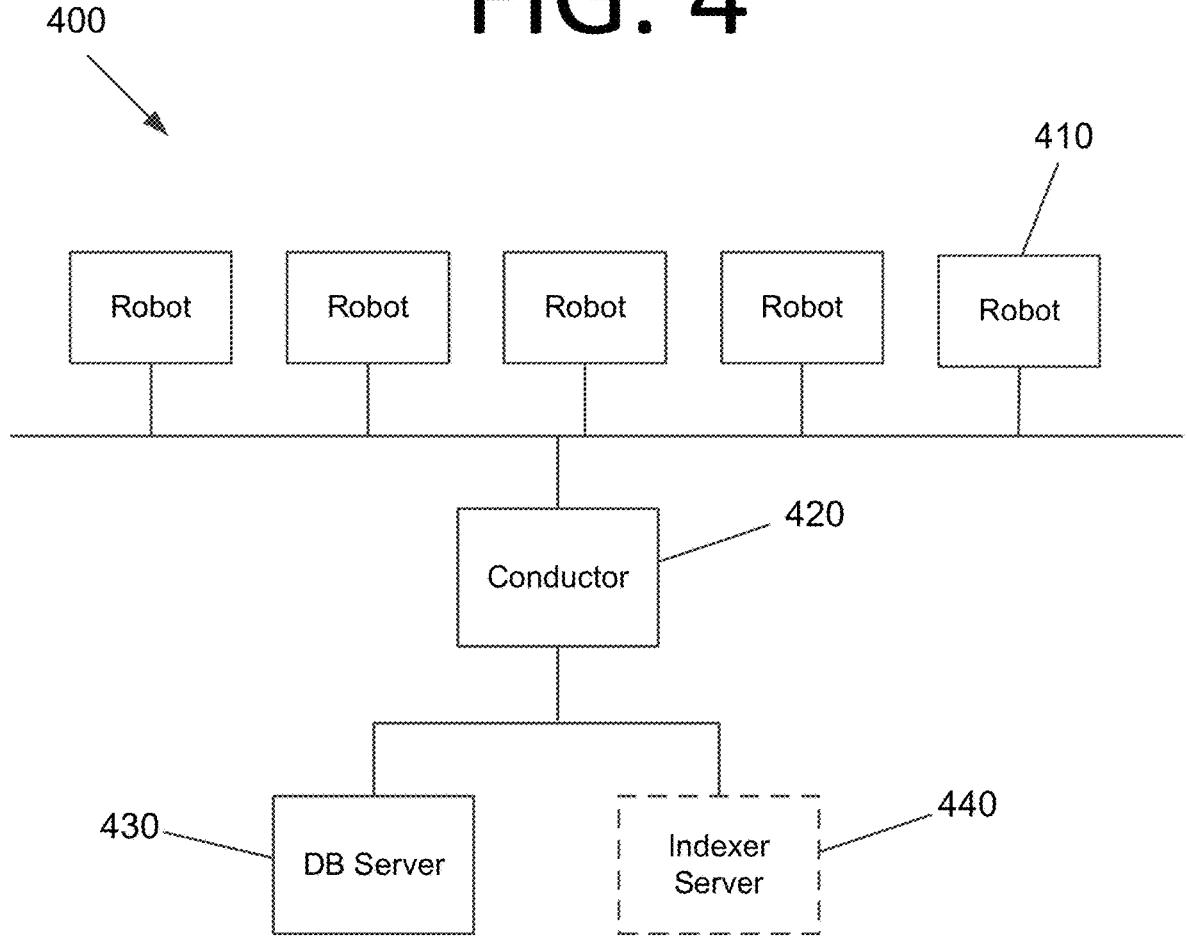
FIG. 4 is an architectural diagram illustrating an RPA system, according to an embodiment of the present invention.

FIG. 4 is an architectural diagram illustrating an RPA system 400, according to an embodiment of the present invention. In some embodiments, RPA system 400 may be or include RPA systems 100 and/or 200 of FIGS. 1 and/or 2. RPA system 400 includes multiple client computing systems 410 running robots. Computing systems 410 are able to communicate with a conductor computing system 420 via a web application running thereon. Conductor computing system 420, in turn, is able to communicate with a database server 430 and an optional indexer server 440.

With respect to FIGS. 1 and 3, it should be noted that while a web application is used in these embodiments, any suitable client/server software may be used without deviating from the scope of the invention. For instance, the conductor may run a server-side application that communicates with non-web-based client software applications on the client computing systems.

Figure 5:
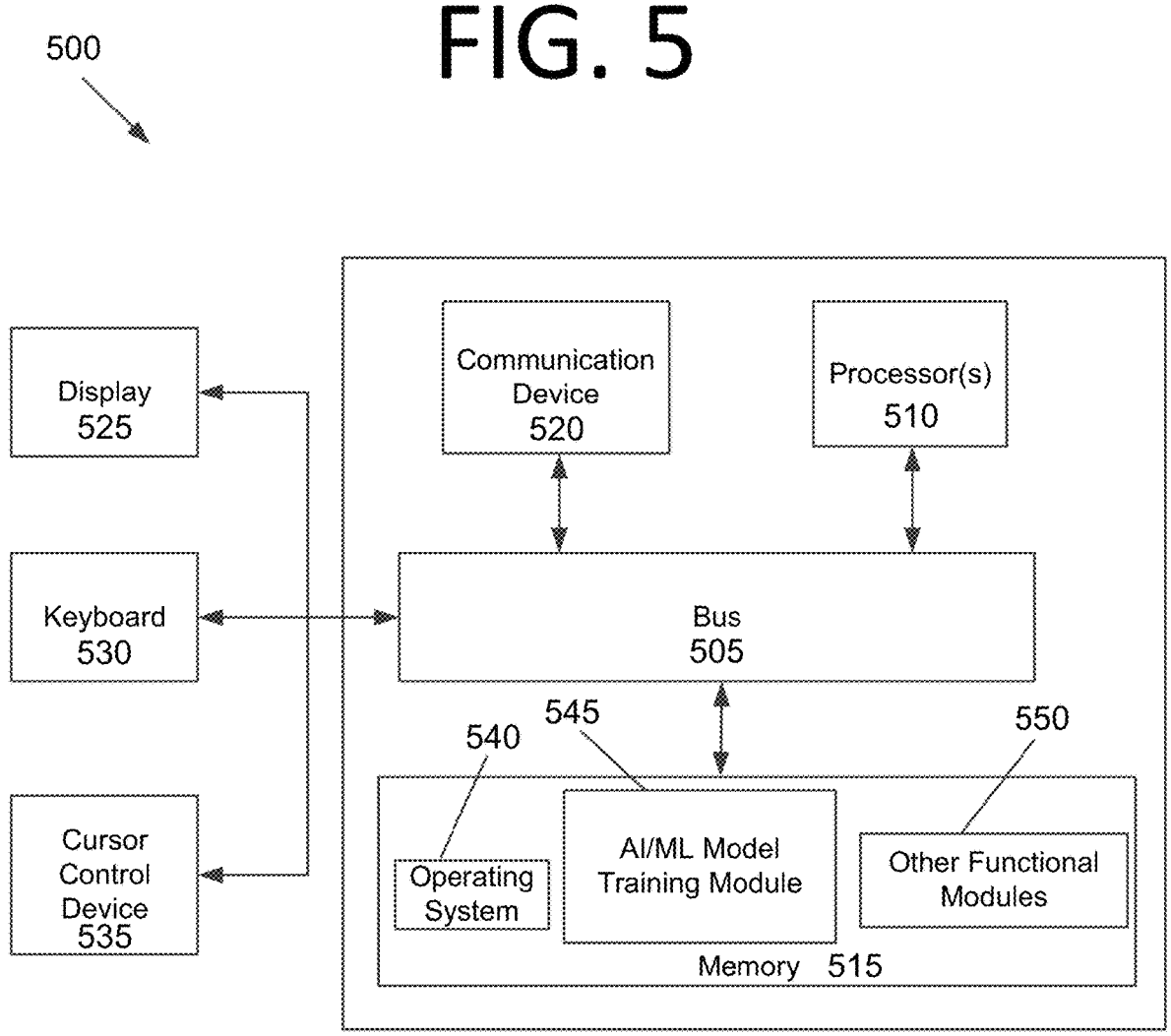
FIG. 5 is an architectural diagram illustrating a computing system configured to train an AI/ML model to recognize applications, screens, and UI elements using CV and to recognize user interactions with the applications, screens, and UI elements, according to an embodiment of the present invention.

FIG. 5 is an architectural diagram illustrating a computing system 500 configured to train an AI/ML model to recognize applications, screens, and UI elements using CV and to recognize user interactions with the applications, screens, and UI elements, according to an embodiment of the present invention. In some embodiments, computing system 500 may be one or more of the computing systems depicted and/or described herein. Computing system 500 includes a bus 505 or other communication mechanism for communicating information, and processor(s) 510 coupled to bus 505 for processing information. Processor(s) 510 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 510 may also have multiple processing cores, and at least some of the cores may be configured to perform specific functions. Multi-parallel processing may be used in some embodiments. In certain embodiments, at least one of processor(s) 510 may be a neuromorphic circuit that includes processing elements that mimic biological neurons. In some embodiments, neuromorphic circuits may not require the typical components of a Von Neumann computing architecture.

Computing system 500 further includes a memory 515 for storing information and instructions to be executed by processor(s) 510. Memory 515 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 510 and may include volatile media, non-volatile media, or both. The media may also be removable, non-removable, or both.

Additionally, computing system 500 includes a communication device 520, such as a transceiver, to provide access to a communications network via a wireless and/or wired connection. In some embodiments, communication device 520 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, communication device 520 may include one or more antennas that are singular, arrayed, phased, switched, beamforming, beamsteering, a combination thereof, and or any other antenna configuration without deviating from the scope of the invention.

Processor(s) 510 are further coupled via bus 505 to a display 525, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. Display 525 may be configured as a touch (haptic) display, a three dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

A keyboard 530 and a cursor control device 535, such as a computer mouse, a touchpad, etc., are further coupled to bus 505 to enable a user to interface with computing system 500. However, in certain embodiments, a physical keyboard and mouse may not be present, and the user may interact with the device solely through display 525 and/or a touchpad (not shown). Any type and combination of input devices may be used as a matter of design choice. In certain embodiments, no physical input device and/or display is present. For instance, the user may interact with computing system 500 remotely via another computing system in communication therewith, or computing system 500 may operate autonomously.

Memory 515 stores software modules that provide functionality when executed by processor(s) 510. The modules include an operating system 540 for computing system 500. The modules further include an AI/ML model training module 545 that is configured to perform all or part of the processes described herein or derivatives thereof. Computing system 500 may include one or more additional functional modules 550 that include additional functionality.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems. The computing system could be part of or otherwise accessible by a local area network (LAN), a mobile communications network, a satellite communications network, the Internet, a public or private cloud, a hybrid cloud, a server farm, any combination thereof, etc. Any localized or distributed architecture may be used without deviating from the scope of the invention.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 6:
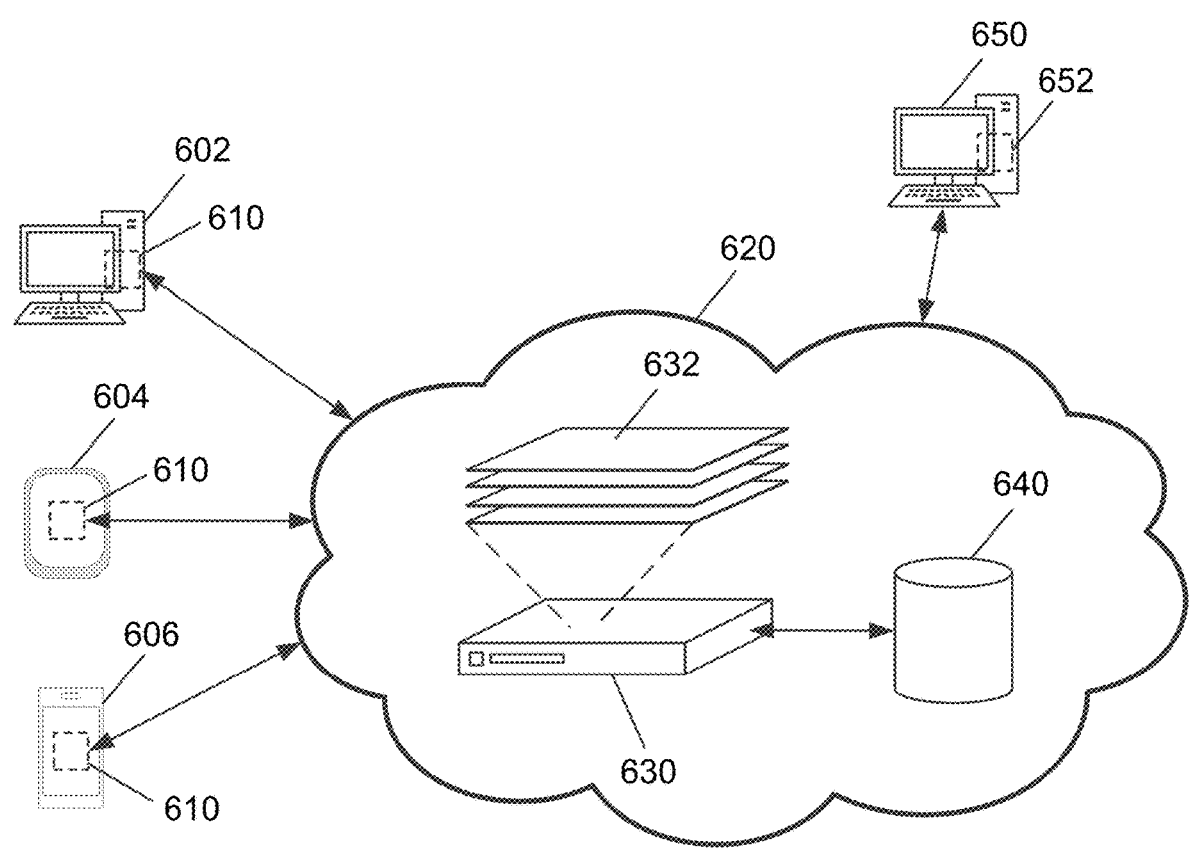
FIG. 6 is an architectural diagram illustrating a system configured to train an AI/ML model to recognize applications, screens, and UI elements using CV and to recognize user interactions with the applications, screens, and UI elements, according to an embodiment of the present invention.

FIG. 6 is an architectural diagram illustrating a system 600 configured to train an AI/ML model to recognize applications, screens, and UI elements using CV and to recognize user interactions with the applications, screens, and UI elements, according to an embodiment of the present invention. System 600 includes user computing systems, such as desktop computer 602, tablet 604, and smart phone 606. However, any desired computing system may be used without deviating from the scope of invention including, but not limited to, smart watches, laptop computers, etc. In some embodiments, one or more of computing systems 602, 604, 606 may include automation boxes and/or cameras. Also, while three user computing systems are shown in FIG. 6, any suitable number of computing systems may be used without deviating from the scope of the invention. For instance, in some embodiments, dozens, hundreds, thousands, or millions of computing systems may be used.

Each computing system 602, 604, 606 has a recorder process 610 (i.e., a tracking application) running thereon that records screenshots and/or video of the user's screen or a portion thereof. For instance, a snippet of JavaScript® may be embedded in a web browser as recorder process 610 to track what components the user interacts with, what text the user enters, what locations/components the user clicks with the mouse, what content the user scrolled past, how long the user stopped on a certain part of the content, etc. Scrolling past content may indicate that the content may have been somewhat close but did not have exactly what the user wanted. Clicks may indicate success.

Recorder processes 610 need not be JavaScript, and may be any suitable type of application and in any desired programming language without deviating from the scope of the invention. This may allow "generalizing" of recorder processes 610 such that they can track user interactions with multiple applications or any application that the user is interacting with. Using labeled training data from scratch may be difficult since while it may allow the AI/ML model to learn to recognize various controls, it does not contain information regarding which controls are commonly used and how. Using recorder processes 610, a "heat map" could be generated to help bootstrap the AI/ML model training process. The heat map may include various information, such as the frequency that a user used applications, the frequency that the user interacted with components of the applications, the locations of the components, the content of the applications/components, etc. In some embodiments, the heat map may be derived from screen analysis, such as detection of typed and/or pasted text, caret tracking, and active element detection for computing systems 602, 604, 606. Some embodiments recognize where on the screen associated with computing systems 602, 604, 606 the user has been typing or pasting text, potentially including hot keys or other keys that do not cause visible characters to appear, and provide the physical position on the screen based on the current resolution (e.g., in coordinates) of where one or more characters appeared, where the cursor was blinking, or both. The physical position of the typing or pasting activity and/or of the caret may allow determination of which field(s) the user is typing in or focused on and what the application is for process discovery or other applications.

Per the above, in some embodiments, recorder processes 610 may record additional data to further assist in training AI/ML model(s), such as web browser history, heat maps, key presses, mouse clicks, locations of mouse clicks and/or graphical elements on the screen that the user is interacting with, locations where the user was looking on the screen at different times, time stamps associated with the screenshot/video frames, etc. This may be beneficial for providing key presses and/or other user actions that may not cause a screen change. For instance, some applications may not provide a visual change when the user presses CTRL+S to save a file. However, in certain embodiments, the AI/ML model(s) may be trained solely based on captured screen images. Recorder processes 610 may be robots generated via an RPA designer application, part of an operating system, a downloadable application for a personal computer (PC) or smart phone, or any other software and/or hardware without deviating from the scope of the invention. Indeed, in some embodiments, the logic of one or more of recorder processes 610 is implemented partially or completely via physical hardware.

Some embodiments are implemented in a feedback loop process that continuously or periodically compares the current screenshot to the previous screenshot to identify changes. Locations where visual changes occurred on the screen may be identified and OCR may be performed on the location where the change occurred. Results of the OCR may then be compared to the content of a keyboard queue (e.g., as determined by key hooking) to determine whether a match exists. The locations where the change occurred may be determined by comparing a box of pixels from the current screenshot to a box of pixels in the same location from a previous screenshot.

Images and/or other data (e.g., web browser history, heat maps, key presses, mouse clicks, locations of mouse clicks and/or graphical elements on the screen that the user is interacting with, locations where the user was looking on the screen at different times, time stamps associated with the screenshot/video frames, voice inputs, gestures, emotions (e.g., whether a user is happy, frustrated, etc.), biometrics (e.g., fingerprints, retinal scans, the user's pulse, etc.), information pertaining to periods of no user activity (e.g., "dead man switches"), haptic information from a haptic display or touch pad, a heat map with multi-touch inputs, etc.) that are recorded by recorder processes 610 are sent via a network 620 (e.g., a local area network (LAN), a mobile communications network, a satellite communications network, the Internet, any combination thereof, etc.) to a server 630. In some embodiments, server 630 may be part of a public cloud architecture, a private cloud architecture, a hybrid cloud architecture, etc. In certain embodiments, server 630 may host multiple software-based servers on a single computing system 630. In some embodiments, server 630 may run a conductor application and the data from recorder processes 610 may be sent periodically as part of the heartbeat message. In certain embodiments, the data may be sent from recorder processes 610 to server 630 once a predetermined amount of data has been collected, after a predetermined time period has elapsed, or both. Server 630 stores the received data from recorder processes 610 in a database 640.

Server 630 includes multiple AI layers 632 in this embodiment that collectively form an AI/ML model. However, in some embodiments, AI/ML models may only have a single layer. In certain embodiments, multiple AI/ML models may be trained on server 630 and used together to collectively accomplish a larger task. AI layers 632 may employ CV techniques and may perform various functions, such as statistical modeling (e.g., hidden Markov models (HMMs)), and utilize deep learning techniques (e.g., long short term memory (LSTM) deep learning, encoding of previous hidden states, etc.) to identify user interactions. Initially, the AI/ML model needs to be trained such that it can perform meaningful analysis of the captured data in database 640. In some embodiments, users of computing systems 602, 604, 606 label the images before they are sent to server 630. Additionally or alternatively, in some embodiments, labeling occurs subsequently, such as via an application 652 running on computing system 650 that allows users to draw bounding boxes and/or other shapes around graphical elements, provide text labels of what is contained in a bounding box, etc.

The AI/ML model goes through a training phase using this data as input and is trained until the AI/ML model is sufficiently accurate, but not overfit to the training data. The accuracy that is acceptable may depend on the application. Identification errors can be highlighted by a human reviewer (e.g., by drawing a box around the misidentified element and including the correct identification), and the AI/ML model can be retrained using this additional labeled data. Once adequately trained, the AI/ML model is able to provide predictions as output, such as which application(s) and graphical element(s) are recognized as being present in a screen.

However, while this level of training provides information regarding what is present, further information may be needed to determine user interactions, such as comparing two or more consecutive screens to determine that a typed character appeared from one to another, a button was pressed, a menu selection occurred, etc. Thus, after the AI/ML model can recognize graphical elements and applications on the screen, in some embodiments, the AI/ML model is further trained to recognize labeled user interactions with the applications in the UI to understand such incremental actions taken by the user. Identification errors can again be highlighted by a human reviewer (e.g., by drawing a box around the misidentified element and including the correct identification), and the AI/ML model can be trained until its accuracy is sufficiently high to be deployed to understand granular user interactions with the UI.

Once trained to recognize user interactions, the trained AI/ML model may be used to analyze video and/or other information from recorder processes 610. This recorded information may include interactions that multiple/many users tend to perform. These interactions can then be analyzed for common sequences for subsequent automation.

AI Layers

In some embodiments, multiple AI layers may be used. Each AI layer is an algorithm (or model) that runs on the data, and the AI model itself may be deep learning neural networks (DLNNs) of trained artificial "neurons" that are trained in training data. Layers may be run in series, in parallel, or a combination thereof.

The AI layers may include, but are not limited to, a sequence extraction layer, a clustering detection layer, a visual component detection layer, a text recognition layer (e.g., OCR), an audio-to-text translation layer, or any combination thereof. However, any desired number and type(s) of layers may be used without deviating from the scope of the invention. Using multiple layers may allow the system to develop a global picture of what is happening in the screens. For example, one AI layer could perform OCR, another could detect buttons, etc.

Patterns may be determined individually by an AI layer or collectively by multiple AI layers. A probability or an output in terms of a user action could be used. For instance, to determine the particulars of a button, its text, where a user clicked, etc., the system may need to know where the button is, its text, the positioning on the screen, etc.

However, it should be noted that various AI/ML models may be used without deviating from the scope of the invention. While AI/ML models may be trained using neural networks in some embodiments, such as DLNNs, recurrent neural networks (RNNs), generative adversarial networks (GANs), any combination thereof, etc., other AI techniques may be used, such as deterministic models, shallow learning neural networks (SLNNs), or any other suitable AI/ML model types and training techniques without deviating from the scope of the invention.

Figure 7:
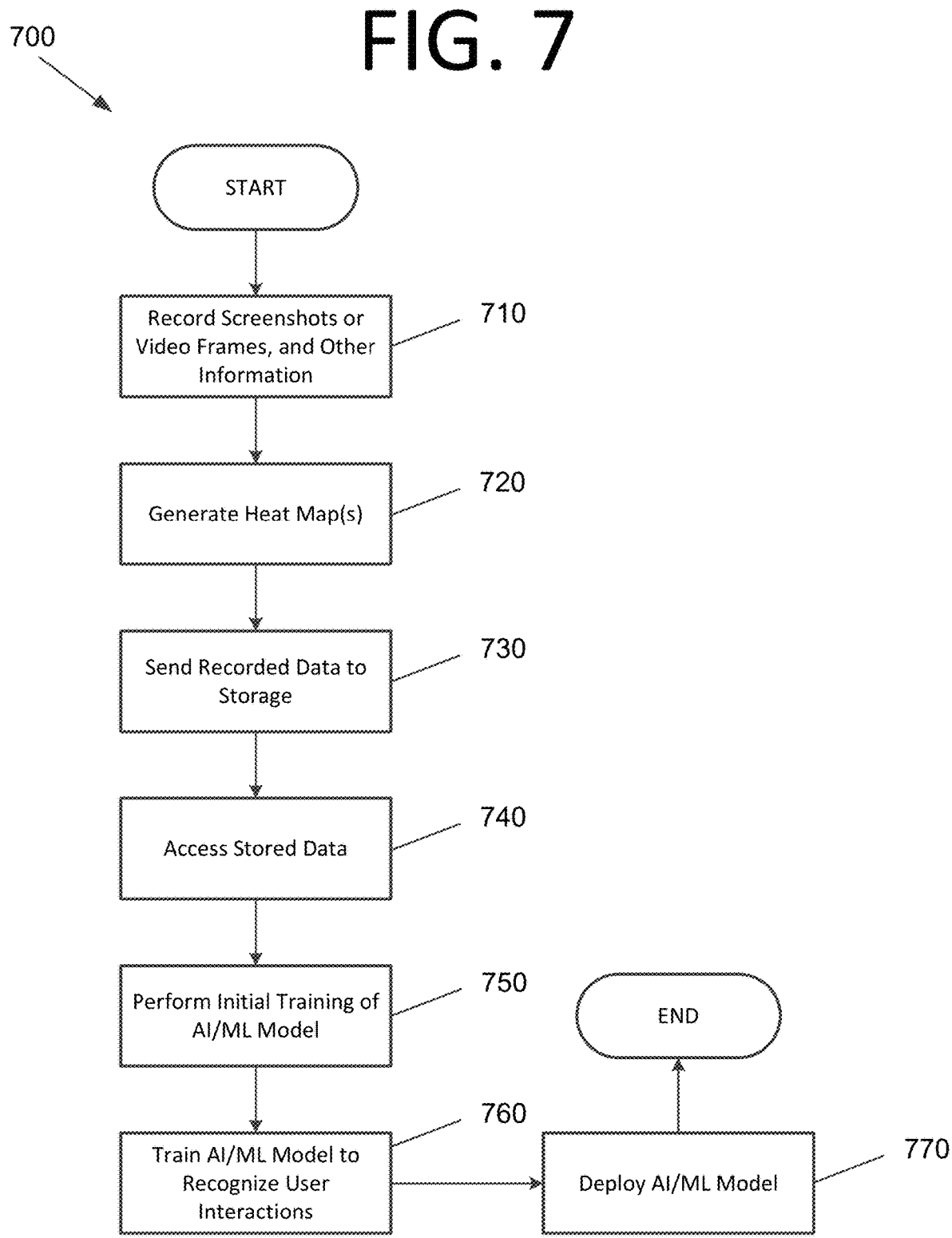
FIG. 7 is a flowchart illustrating a process for training an AI/ML model to recognize applications, screens, and UI elements using CV and to recognize user interactions with the applications, screens, and UI elements, according to an embodiment of the present invention.

FIG. 7 is a flowchart illustrating a process 700 for training an AI/ML model to recognize applications, screens, and UI elements using CV and to recognize user interactions with the applications, screens, and UI elements, according to an embodiment of the present invention. The process begins with recording screenshots or video frames displays associated with user computing systems and other information at 710. In some embodiments, the recording is performed by one or more recorder processes. In certain embodiments, the recorder processes are implemented as feedback loop processes that continuously or periodically compare a current screenshot or video frame to a previous screenshot or video frame and identify one or more locations where changes between the current screenshot or video frame and the previous screenshot or video frame occurred. In some embodiments, the recorder processes are configured to perform OCR on the one or more locations where the changes occurred, compare results of the OCR to content of a keyboard queue to determine whether a match exists, and when a match exists, link text associated with the match to a respective location. In some embodiments, the other information includes a web browser history, one or more heat maps, key presses, mouse clicks, locations of mouse clicks and/or graphical elements on the display that a user is interacting with, locations where the user was looking on the display, time stamps associated with the screenshots or video frames, text that the user entered, content that the user scrolled past, a time that the user stopped on a part of content shown in the display, what application the user is interacting with, or a combination thereof. In certain embodiments, at least part of the other information is captured using one or more automation boxes.

One or more heat maps are generated as part of the other information at 720. In some embodiments, the one or more heat maps include a frequency that a user used applications, a frequency that the user interacted with components of the applications, locations of the components in the applications, content of the applications and/or components, or a combination thereof. In certain embodiments, the one or more heat maps are derived from display analysis that includes detection of typed and/or pasted text, caret tracking, active element detection, or a combination thereof. The recorded screenshots or video frames, and the other information, are then sent to storage accessible by one or more servers at 730.

The recorded screenshots or video frames and the other information are accessed at 740 (e.g., via a server configured to train an AI/ML model). The AI/ML model is initially trained to recognize the applications, screens, and UI elements that are present in the recorded screenshots or video frames using the recorded screenshots or video frames and the other information at 750. In some embodiments, the initial training of the AI/ML model is performed without a priori knowledge of the applications, screens, and UI elements in the screenshots or video frames.

After the AI/ML model can recognize the applications, screens, and UI elements in the recorded screenshots or video frames with a confidence (e.g., 70%, 95%, 99.99%, etc.), the AI/ML model is trained to recognize individual user interactions with the UI elements at 760. In some embodiments, the individual user interactions include button presses, entry of single characters or character sequences, selection of active UI elements, menu selections, screen changes, or a combination thereof. In certain embodiments, the training of the AI/ML model to recognize the individual user interactions with the UI elements includes comparing two or more consecutive screenshots or video frames and determining that a typed character appeared from one to another, a button was pressed, or a menu selection occurred. The AI/ML model is then deployed such that it can be called and used by calling processes (e.g., RPA robots) at 770.

Figure 8:
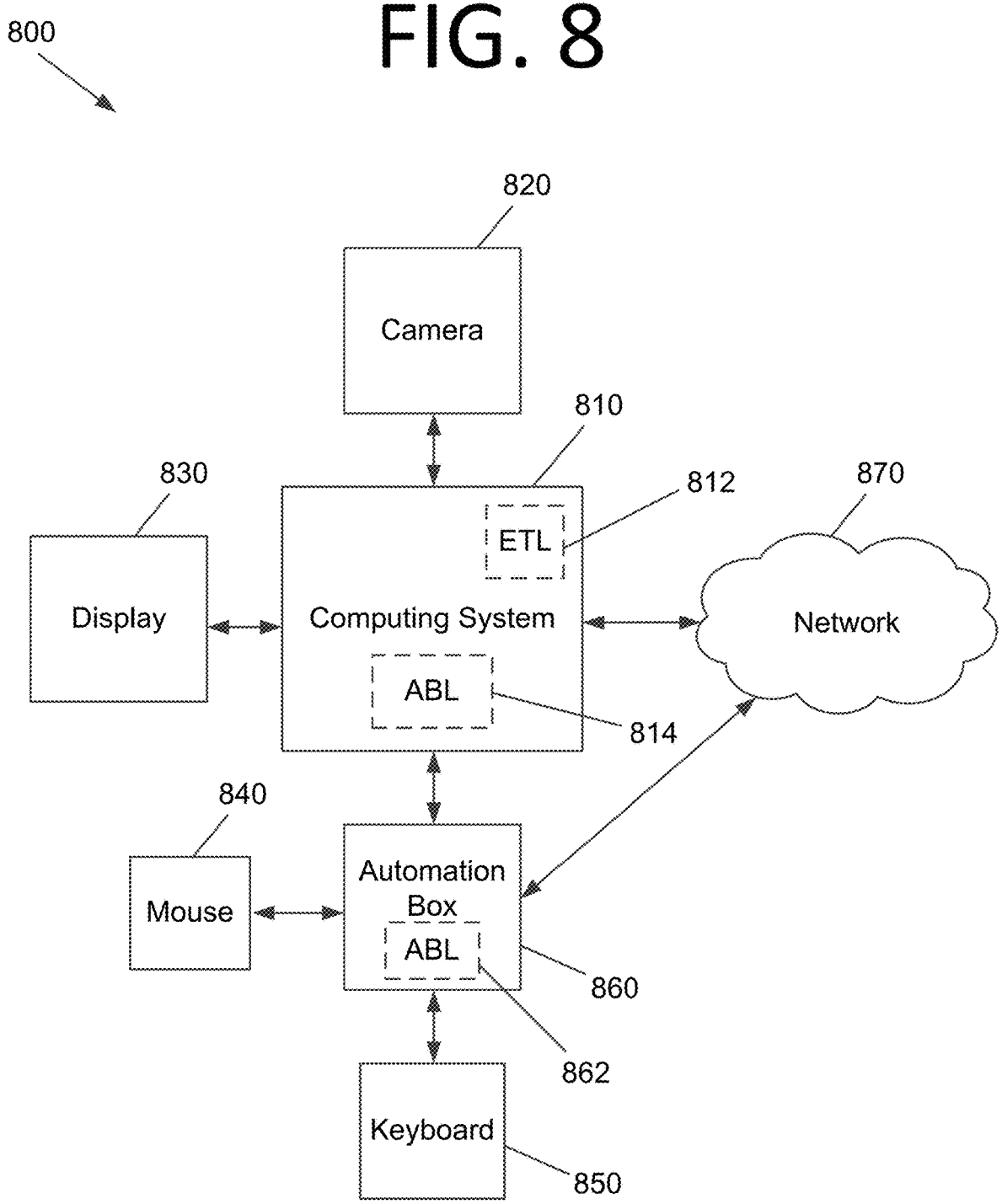
FIG. 8 is an architectural diagram illustrating an automation box and eye movement tracking system, according to an embodiment of the present invention.

FIG. 8 is an architectural diagram illustrating an automation box and eye movement tracking system 800, according to an embodiment of the present invention. System 800 includes a computing system 810 that includes eye tracking logic (ETL) 812 that is configured to process input from a camera 820 and automation box logic (ABL) 814 that is configured to process input from an automation box 860. In some embodiments, computing system 810 may be or include computing system 500 of FIG. 5. In certain embodiments multiple cameras may be used.

Camera 820 records video of a user while the user is interacting with computing system 810 via a mouse 840 and a keyboard 850. Computing system 810 converts the recorded camera video into video frames. ETL processes these frames identifies the user's eyes and interpolates the location where the user is looking to a location on a display 830. Any suitable eye tracking technique(s) may be used without deviating from the scope of the invention, such as those described in U.S. Patent Application Publication No 2018/0046248, U.S. Pat. No. 7,682,026, etc. Time stamps may be associated with the video frames of the user such that they can be matched with screenshot frames of what is displayed on display 830 at that time.

An automation box 860 also includes automation box logic 862 in this embodiment that receives input from mouse 840 and keyboard 850. In some embodiments, automation box 860 may have similar hardware to computing system 810 (e.g., processor(s), memory, a bus, etc.). This input may then be passed along to computing system 810. While mouse 840 and keyboard 850 are shown in FIG. 8, any suitable input device(s) may be used without deviating from the scope of the invention, such as a touchpad, buttons, etc. In some embodiments, only computing system 810 or automation box 860 include automation box logic. A reason for the latter may be to record user interactions and send them directly to a server (e.g., a cloud-based server) for subsequent processing via network 870. In such embodiments, screenshot frames may also be sent from computing system 810 to automation box 860 and then on to the server via network 870. Alternatively, computing system 810 may send the screenshots itself via network 870. Such embodiments may provide a plug-and-play tracking solution that can be plugged into computing system 810, relay keyboard and mouse information to computing system 810 for its operations, and also relay keyboard and mouse click information to a remote server for subsequent training of an AI/ML model.

In some embodiments, automation box 860 may include actuation logic that runs an automation and simulates inputs. This may allow automation box 860 to provide simulated key presses, mouse movements and clicks, etc. to computing system 810 as though this information was actually coming from a human user interacting with these components. The UI screenshots and other information may then be used to train the AI/ML model. Another advantage of such embodiments is that the AI/ML model can be trained when the user is away from computing system 810, potentially allowing for larger amounts of training information to be captured more quickly, and thus, also potentially allowing for the AI/ML model to be trained more quickly.

In certain embodiments, an "information box" may be implemented as software on computing system 610 and may function in a similar manner to recorder processes 610 of FIG. 6. Such embodiments may store screenshot frames, mouse click information, and key press information. In certain embodiments, eye tracking information may also be tracked. This information may then be sent to a server via network 870, and gaze tracking may potentially be performed remotely rather than on computing system 810.

The process steps performed in FIG. 7 may be performed by a computer program, encoding instructions for the processor(s) to perform at least part of the process(es) described in FIG. 7, in accordance with embodiments of the present invention. The computer program may be embodied on a non-transitory computer-readable medium. The computer-readable medium may be, but is not limited to, a hard disk drive, a flash device, RAM, a tape, and/or any other such medium or combination of media used to store data. The computer program may include encoded instructions for controlling processor(s) of a computing system (e.g., processor(s) 510 of computing system 500 of FIG. 5) to implement all or part of the process steps described in FIG. 7, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A system, comprising:
one or more user computing systems comprising respective recorder processes; and
a server configured to train an artificial intelligence (AI)/machine learning (ML) model to recognize applications, screens, and user interface (UI) elements using computer vision (CV) and to recognize user interactions with the applications, screens, and UI elements, wherein the respective recorder processes are configured to:
record screenshots or video frames of a display associated with the respective user computing system and other information, and
send the recorded screenshots or video frames, and the other information, to storage accessible by the server, and the server is configured to:
initially train the AI/ML model to recognize the applications, screens, and UI elements that are present in the recorded screenshots or video frames using the recorded screenshots or video frames and the other information, and
after the AI/ML model can recognize the applications, screens, and UI elements in the recorded screenshots or video frames with a confidence, train the AI/ML model to recognize individual user interactions with the UI elements.

2. The system of claim 1, wherein the individual user interactions comprise button presses, entry of single characters or character sequences, selection of active UI elements, menu selections, screen changes, voice inputs, gestures, providing biometric information, haptic interactions, or a combination thereof.

3. The system of claim 1, wherein the training of the AI/ML model to recognize the individual user interactions with the UI elements comprises comparing two or more consecutive screenshots or video frames and determining that a typed character appeared from one screenshot to another, a button was pressed, or a menu selection occurred.

4. The system of claim 1, wherein the other information comprises a web browser history, one or more heat maps, key presses, mouse clicks, locations of mouse clicks and/or graphical elements on the display that a user is interacting with, locations where the user was looking on the display, time stamps associated with the screenshots or video frames, text that the user entered, content that the user scrolled past, a time that the user stopped on a part of content shown in the display, what application the user is interacting with, voice inputs, gestures, emotion information, biometrics, information pertaining to periods of no user activity, haptic information, multi-touch input information, or a combination thereof.

5. The system of claim 1, wherein
the one or more user computing systems or the server are configured to generate one or more heat maps, the other information comprising the one or more heat maps, and
the one or more heat maps comprise a frequency that a user used applications, a frequency that the user interacted with components of the applications, locations of the components in the applications, content of the applications and/or components, or a combination thereof.

6. The system of claim 5, wherein the one or more user computing systems or the server are configured to derive the one or more heat maps from display analysis comprising detection of typed and/or pasted text, caret tracking, active element detection, or a combination thereof.

7. The system of claim 1, wherein the respective recorder processes are implemented as feedback loop processes that continuously or periodically compare a current screenshot or video frame to a previous screenshot or video frame and identify one or more locations where changes between the current screenshot or video frame and the previous screenshot or video frame occurred.

8. The system of claim 7, wherein the respective recorder processes are further configured to:
perform optical character recognition (OCR) on the one or more locations where the changes occurred;
compare results of the OCR to content of a keyboard queue to determine whether a match exists; and
when a match exists, link text associated with the match to a respective location.

9. The system of claim 1, further comprising:
an automation box operably connected to a user computing system of the one or more user computing systems, the automation box configured to:
receive input from one or more user input devices,
associate time stamps with the input, and
send the time stamped input to storage accessible by the server, wherein
the server is configured to use the time stamped input for the initial training of the AI/ML model.

10. The system of claim 1, wherein server is configured to perform the initial training of the AI/ML model without a priori knowledge of the applications, screens, and UI elements in the screenshots or video frames.

11. A non-transitory computer-readable medium storing a computer program configured to train an artificial intelligence (AI)/machine learning (ML) model to recognize applications, screens, and user interface (UI) elements using computer vision (CV) and/or to recognize user interactions with the applications, screens, and UI elements, the computer program configured to cause at least one processor to:
access recorded screenshots or video frames of displays associated with one or more computing systems and access other information associated with the one or more computing systems; and
initially train the AI/ML, model to recognize the applications, screens, and UI elements that are present in the recorded screenshots or video frames using the recorded screenshots or video frames and the other information, wherein
the initial training of the AI/ML model is performed without a priori knowledge of the applications, screens, and UI elements in the screenshots or video frames.

12. The non-transitory computer-readable medium of claim 11, wherein after the AI/ML model can recognize the applications, screens, and UI elements in the recorded screenshots or video frames with a confidence, the computer program is further configured to cause the at least one processor to:
train the AI/ML model to recognize individual user interactions with the UI elements.

13. The non-transitory computer-readable medium of claim 12, wherein the training of the AI/ML model to recognize the individual user interactions with the UI elements comprises comparing two or more consecutive screenshots or video frames and determining that a typed character appeared from one to another, a button was pressed, or a menu selection occurred.

14. The non-transitory computer-readable medium of claim 12, wherein the individual user interactions comprise button presses, entry of single characters or character sequences, selection of active UI elements, menu selections, screen changes, voice inputs, gestures, providing biometric information, haptic interactions, or a combination thereof.

15. The non-transitory computer-readable medium of claim 11, wherein the other information comprises a web browser history, one or more heat maps, key presses, mouse clicks, locations of mouse clicks and/or graphical elements on the display that a user is interacting with, locations where the user was looking on the display, time stamps associated with the screenshots or video frames, text that the user entered, content that the user scrolled past, a time that the user stopped on a part of content shown in the display, what application the user is interacting with, voice inputs, gestures, emotion information, biometrics, information pertaining to periods of no user activity, haptic information, multi-touch input information, or a combination thereof.

16. The non-transitory computer-readable medium of claim 11, wherein the computer program is further configured to cause the at least one processor to:
generate one or more heat maps, the other information comprising the one or more heat maps, wherein
the one or more heat maps comprise a frequency that a user used one or more applications, a frequency that the user interacted with components of the one or more applications, locations of the components in the one or more applications, content of the one or more applications and/or components, or a combination thereof.

17. The non-transitory computer-readable medium of claim 16, wherein the one or more heat maps are derived from display analysis comprising detection of typed and/or pasted text, caret tracking, active element detection, or a combination thereof.

18. A computer-implemented method for training an artificial intelligence (AI)/machine learning (ML) model to recognize applications, screens, and user interface (UI) elements using computer vision (CV) and to recognize user interactions with the applications, screens, and UI elements, the method comprising:
accessing recorded screenshots or video frames of displays associated with one or more computing systems and accessing other information associated with the one or more computing systems;
initially training the AI/ML model to recognize the applications, screens, and UI elements that are present in the recorded screenshots or video frames using the recorded screenshots or video frames and the other information; and
after the AI/ML model can recognize the applications, screens, and UI elements in the recorded screenshots or video frames with a confidence, training the AI/ML model to recognize individual user interactions with the UI elements.

19. The computer-implemented method of claim 18, wherein the initial training of the AI/ML model is performed without a priori knowledge of the applications, screens, and UI elements in the screenshots or video frames.

20. The computer-implemented method of claim 18, wherein the training of the AI/ML model to recognize the individual user interactions with the UI elements comprises comparing two or more consecutive screenshots or video frames and determining that a typed character appeared from one to another, a button was pressed, or a menu selection occurred.

21. The computer-implemented method of claim 18, wherein the individual user interactions comprise button presses, entry of single characters or character sequences, selection of active UI elements, menu selections, screen changes, voice inputs, gestures, providing biometric information, haptic interactions, or a combination thereof.

22. The computer-implemented method of claim 18, wherein the other information comprises a web browser history, one or more heat maps, key presses, mouse clicks, locations of mouse clicks and/or graphical elements on the display that a user is interacting with, locations where the user was looking on the display, time stamps associated with the screenshots or video frames, text that the user entered, content that the user scrolled past, a time that the user stopped on a part of content shown in the display, what application the user is interacting with, voice inputs, gestures, emotion information, biometrics, information pertaining to periods of no user activity, haptic information, multi-touch input information, or a combination thereof.

23. The computer-implemented method of claim 18, further comprising:
generating one or more heat maps, the other information comprising the one or more heat maps, wherein
the one or more heat maps comprise a frequency that a user used one or more applications, a frequency that the user interacted with components of the one or more applications, locations of the components in the one or more applications, content of the one or more applications and/or components, or a combination thereof, and
the one or more heat maps are derived from display analysis comprising detection of typed and/or pasted text, caret tracking, active element detection, or a combination thereof.

* * * * *